June 14, 1960
C. C. FUERST
2,940,374
CAMERA SHUTTER
Filed April 30, 1958
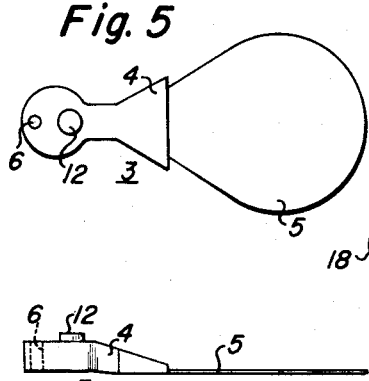
Fig. 5
Fig. 6
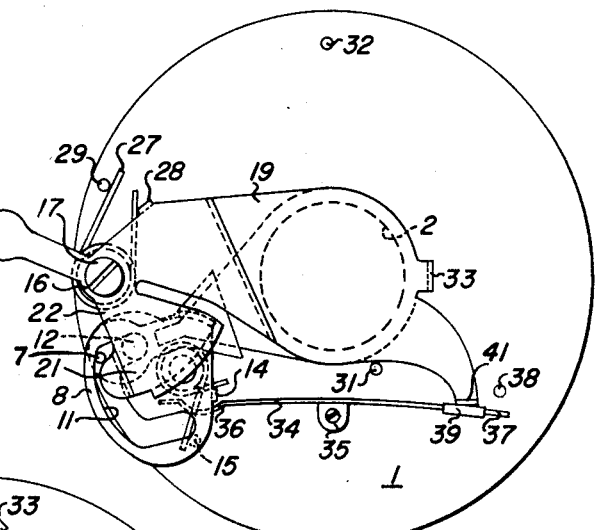
Fig. 1
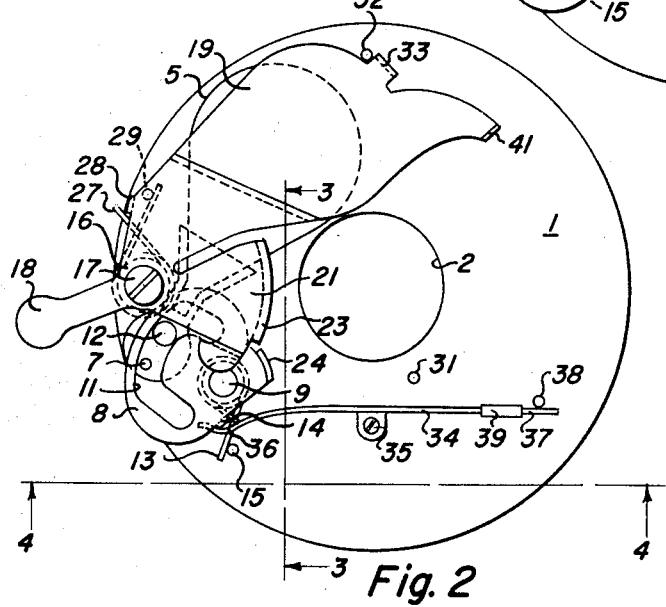
Fig. 2
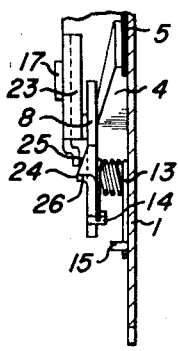
Fig. 3
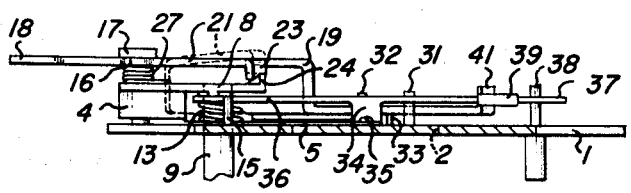
Fig. 4
CARL C. FUERST
INVENTOR.
BY R. Frank Smith
Steve W. Grambau
ATTORNEYS

United States Patent Office 2,940,374
Patented June 14, 1960

2,940,374

CAMERA SHUTTER

Carl C. Fuerst, Rochester, N.Y., assignor to Eastman Kodak Company, Rochester, N.Y., a corporation of New Jersey Filed Apr. 30, 1958, Ser. No. 731,957

2 Claims. (Cl. 95—60)

This invention relates generally to photography, and more specifically to an improved camera shutter.

There exists a need in the photographic art for a simple, compact single-speed shutter for use with miniature, lightweight cameras. Many of the shutters that have heretofore been satisfactory for larger type cameras are objectional when used in connection with a small camera. Many of these shutters are of relatively complicated construction containing a large number of stationary and moving parts and consequently requiring a considerable amount of power to actuate the trigger to operate the camera. Although the operation of this type of shutter is satisfactory for larger and heavier cameras, it is particularly difficult to hold a small, light camera steady during the exposure.

Accordingly, one of the primary objects of this invention is to produce a shutter having an extremely light trigger action, and one in which the shutter has practically no tendency to shake the camera.

Another object of this invention is to provide an improved shutter for a camera that is of simple design and construction, thoroughly reliable and efficient in operation, and economical to manufacture.

One more object of this invention is to provide a constant exposure shutter with the speed of the exposure depending solely upon a single operating spring.

Still another object of this invention is to provide a shutter in which the shutter parts move smoothly, and noiselessly with very little rebound.

Objects and advantages other than those set forth above will be apparent from the following description when read in connection with the accompanying drawing, in which:

Fig. 1 is a plan view of a shutter embodying the invention with the shutter in a cocked position;

Fig. 2 is a view similar to Fig. 1 showing the trigger in a depressed position shortly after releasing the shutter-actuating cam which has partially run down;

Fig. 3 is a segmental section view taken along line 3—3 of Fig. 2;

Fig. 4 is a section view taken along line 4—4 of Fig. 2;

Fig. 5 is a plan view of the shutter blade, and

Fig. 6 is a side elevation view of the shutter blade of Fig. 5.

As shown in the drawings, an extremely simple type of shutter is disclosed having a base plate 1 provided with an aperture 2 to permit light rays to enter and pass through a lens to a film in the usual manner. The plate 1 is attached to the front end of a camera body, not shown, by any suitable means. A shutter blade 3 is provided as best shown in Figs. 5 and 6 having a plastic shank 4 formed of nylon or other suitable material rigidly secured to a flat, metal disk 5. The shank 4 is provided at one end with an opening 6 for receiving a pin 7 rigidly secured to the base plate 1 for pivotally mounting the shutter blade 3 on the plate with the disk 5 cooperating with the aperture 2 to selectively uncover and cover the aperture to make an exposure. A shutter blade actuating cam 8, as best seen in Fig. 2, is rigidly secured to a shaft 9 rotatably carried by the base plate 1, the shaft 9 in turn being connected to and actuated by the camera film advance mechanism, not shown. The cam 8 forms a substantially U-shaped slot 11 for receiving a cylindrical lug 12 formed by the plastic shank 4, and is adapted when the cam 8 is rotated in one direction or the other to pivotally move the shutter plate 3 causing it to uncover and cover the aperture 2. A helical spring 13 is disposed on the portion of the shaft 9 between the base plate 1 and the cam 8, and has one end held by an ear 14 provided by the cam 8 and the opposite end held by a pin 15 carried by the plate 1 to resiliently bias the cam 8 in a clockwise direction from a shutter cocked position such as shown in Fig. 1 to a shutter released position in which the lug 12 engages the opposite end of the slot 11 preventing any further clockwise movement. A shutter release member comprising a generally Y-shaped plate member 16 is pivotally mounted on a stud 17 carried by the base plate 1 and forms a trigger 18, a cover blind 19 and a pie-shaped resilient segment 21 having a thin necked-down portion 22 as best seen in Fig. 1. The segment 21 may be provided with an opening therein to reduce the weight of the segment and increase its resiliency so that it may be moved laterally of the stud 17 for a purpose to be explained hereinafter. The lateral movement imparted to the segment 21 is accomplished by an arcuate depending flange 23 subtending an angle of approximately 45° formed by the segment 21 and adapted to cooperate with a camming ear 24 formed by the cam 8. The ear 24 has an inclined leading edge 25 terminating in a shoulder 26 at the rear as best seen in Fig. 3. A helical spring 27 is disposed on the stud 17 and has one end held by an ear 28 formed by the cover blind 19 and the opposite end held by a pin 29 carried by the base plate 1 for biasing the shutter release member 16 in a clockwise direction. The member 16 is urged clockwise until the cover blind 19 engages a stop pin 31 mounted on the base plate 1 preventing any further clockwise movement of the member as seen in Fig. 1. The cover blind 19 in this position covers the aperture 2 in the base plate 1. Another stop pin 32 carried by the base plate 1 engages a lug 33 formed by the cover blind 19 to limit pivotal movement of the cover blind in a counter-clockwise direction as seen in Fig. 2.

The shutter is provided with a synchronizing mechanism for flash lamp use to assure that the maximum brilliance of the flash coincides with the maximum opening of the shutter blade 3. The synchronizing mechanism comprises a spring member 34 secured to the base plate 1 by a screw 35 and having one spring arm 36 adapted to be engaged by the ear 14 of the cam 8 when the cam is partially run down, and another spring arm 37 adapted to engage a post 38 to which the flash lamp is connected. A portion of the arm 37 is covered with an insulating material 39 and a lug 41 formed by the cover blind 19 engages the insulating material 39 and moves the arm 37 out of contact with the post 38 while the shutter release member 16 holds the shutter in a shutter cocked position as seen in Fig. 1.

In the operation of this invention, let us assume initially that the camera operator has depressed the trigger 18 making an exposure. Upon release of the trigger 18, the shutter release member 16 is urged clockwise by its spring 27 until the cover blind 19 engages the pin 31 as seen in Fig. 1. In this position, the cover blind 19 covers the aperture 2 and the lug 41 engages the spring arm 37 withdrawing the arm from the post 38 and breaking the flash lamp circuit. The operator then actuates the film-advance mechanism to advance the film one picture frame. The film-advance mechanism in advancing the film simultaneously rotates the shaft 9 and actuating cam 8 in a counterclockwise direction. As the movement of the shaft 9 and cam 8 continues, the leading edge 25 of the camming ear 24 engages and urges the depending flange 23 laterally of the stud 17 and passes thereunder. When the ear 24 clears the flange 23, the flange drops behind the shoulder 26 of the ear 24 releasably holding the cam 8 in the shutter-cocked position as seen in Fig. 1. As the shaft 9 and cam 8 are rotated into the cocked position, the slot 11 actuates the lug 12 causing the shutter blade 3 to initially open and then close the aperture 2. Although the shutter blade 3 uncovers the aperture 2, no light passes therethrough because the cover blind 19 covers the aperture while the shutter is being cocked. While in the cocked position, the ear 14 of the cam 8 is out of engagement with the arm 36 of the synchronizer member 34.

To actuate the shutter to make an exposure, the trigger 18 is depressed moving the shutter release member 16 in a counterclockwise direction. Initial movement of the trigger 18 withdraws the cover blind lug 41 from the spring arm 37 allowing the arm to make contact with the post 38. The flash lamp is not actuated, however, since the ear 14 of the cam 8 is not in engagement with the arm 36 of the synchronizer member 34. As the trigger 18 is depressed further, the arcuate flange 23 slides along the shoulder 26 of the camming ear 24 retaining the actuating cam 8 in the cocked position until the cover blind 19 uncovers the aperture 2 which occurs when the cover blind lug 33 engages the stop pin 32 as seen in Fig. 2. As soon as this occurs, the flange 23 releases the ear 24, allowing the spring-biased actuating cam 8 to return to its original position, and in running down to open and close the aperture 2 to make the exposure. When the shutter is released, the ear 14 of the cam 8 is initially out of engagement with the arm 36 and does not engage the arm for actuating the flash lamp until the cam run-down has progressed to the point where the shutter blade 3 uncovers the aperture 2.

Although but one embodiment has been illustrated and described, it will be apparent to those skilled in the art that various changes and modifications may be made therein without departing from the spirit of the invention or from the scope of the appended claims.

I claim:
1. In a shutter mechanism for a camera having an aperture in alignment with the optic axis, the combination comprising: a shutter blade pivotally mounted on said camera and having a cylindrical lug; an actuating cam rotatably carried by said camera and having a substantially U-shaped slot adapted to receive said lug and upon turning of said cam to cause said shutter blade to uncover and cover said aperture to make an exposure; a first spring for biasing said actuating cam in one direction; a substantially Y-shaped shutter release plate member pivotally mounted on said camera and including a trigger for actuating said shutter, a cover blind adapted to cooperate with said aperture, and a resilient escapement mechanism having an arcuate depending flange; a second spring for biasing said shutter release member in said one direction; and an ear formed by said actuating cam and adapted when said cam is turned in the opposite direction to engage said flange and urge said flange laterally as said ear passes thereunder, said flange dropping behind said ear when said ear clears said flange to releasably hold said ear and actuating cam in a shutter cocked position against the bias of said first spring, said trigger when depressed to make an exposure pivotally moving said shutter release member in the opposite direction against the bias of said second spring causing said arcuate flange to release said ear and actuating cam as said cover blind uncovers said aperture whereby said first spring urges said actuating cam in said one direction causing said shutter blade to uncover and cover said aperture to make an exposure.

2. The invention as defined in claim 1, wherein said flange subtends an angle of approximately 45°, and said ear has an inclined leading edge for urging said flange laterally, said leading edge terminating in a shoulder cooperating with said resilient flange to releasably hold said actuating cam in a shutter cocked position.

References Cited in the file of this patent
UNITED STATES PATENTS

| | | |
|---|---|---|
| 451,880 | Packard | May 5, 1891 |
| 639,993 | Juruick | Dec. 26, 1899 |
| 2,486,169 | Kaplowitz | Oct. 25, 1949 |